Oct. 22, 1935.   H. ESSER   2,018,300
METHOD OF PRODUCING INDUSTRIAL IRON BY MEANS OF IRON SPONGE
Filed Jan. 12, 1933
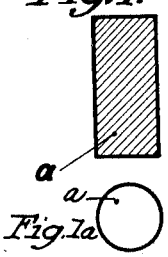
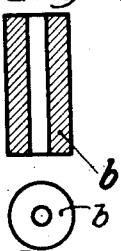
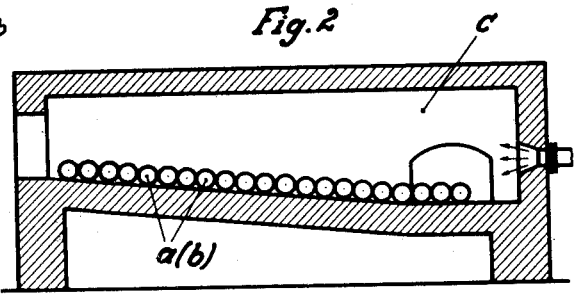
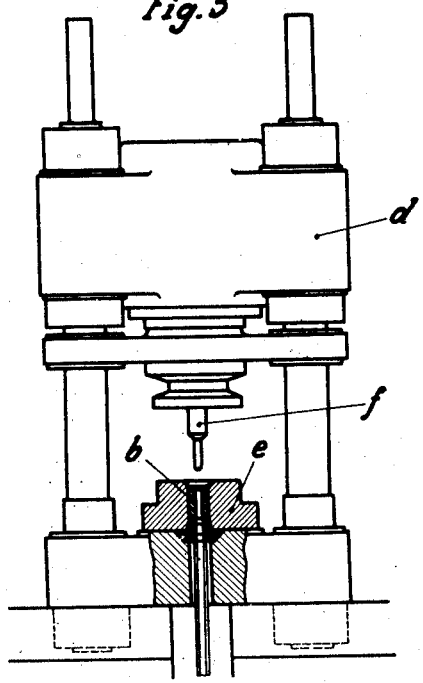
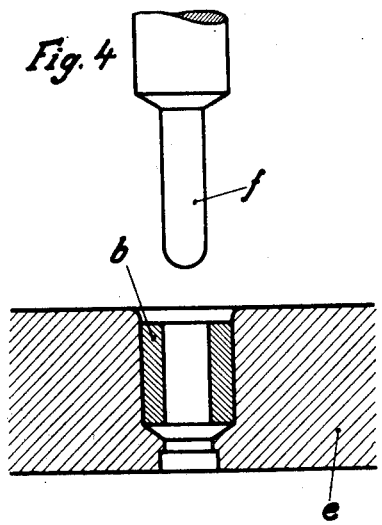
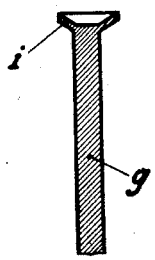
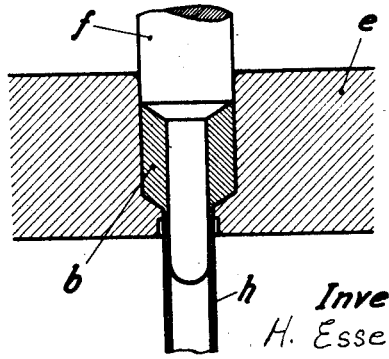
Inventor:
H. Esser
By: Marks & Clerk
Attys

UNITED STATES PATENT OFFICE 2,018,300

METHOD OF PRODUCING INDUSTRIAL IRON BY MEANS OF IRON SPONGE

Heinrich Esser, Hilden, Germany

Application January 12, 1933, Serial No. 651,411
In Germany January 13, 1932

9 Claims. (Cl. 75—14)

This invention relates to a method of producing industrial iron by means of iron sponge.

The energies required during the reduction of iron ore in the blast furnace and the additional energies needed during the fining of the pig iron produced in the blast furnace in order to obtain an iron that will be ductile when hot led quite early to efforts to produce such iron directly from the ore.

Various processes have been proposed for the direct reduction of iron ore to iron sponge by men like Flodin, Basset, Edwin, Duffield and Wiberg. The iron sponge, which usually comes out in pulverulent condition, is briquetted to serve as starting material in the production of steel. From briquetted iron sponge, according to known steel producing methods, in liquid condition, the desired final product is obtained with which corresponding additions are alloyed to attain the desired properties of finished steel. Iron sponge has given satisfaction as charge material in the production of steel on account of its virginal properties, comprising, among others, mainly the complete lack of dissolved oxygen which is said to disclose highly detrimental properties when steel is made after the old method, i. e., from scrap and pig iron. When iron that is ductile when hot is produced from iron sponge in liquid condition under the known steel producing methods, this property of iron sponge is partly lost again, since the iron sponge is extraordinarily reactive and eagerly dissolves oxygen.

It has already been proposed to obtain wrought iron from iron sponge without remelting and it has also been proposed to manufacture by pressing alloys from iron sponge with other metals mixed together in finely divided form. In this known process however it was necessary to use such temperatures at which the alloying additions are melting and the deforming operation was in the known processes not large enough to obtain an intimate combination of the particles.

The defects connected with the known processes are eliminated when industrial iron is produced according to the present invention. According to the latter, pulverulent iron sponge in the form as originally produced is pressed, preferably after having been thoroughly mixed with additions which impart the desired properties to the final product. Owing to this thorough mixing prior to pressing, the material obtained is already homogeneous to a considerable extent, and the homogenization process may be furthered according to the invention by the amount and duration of pressure and, possibly, by the use of higher temperatures. This preliminary iron sponge product is then subjected to further treatment in an extrusion press of the kind, which is used for instance in the manufacture of metal tubes, such as tubes from brass, bronze, or lead (Dick type) at increased temperatures which may amount to between 700 and 1300° C. and thus made into the final product wanted. The specific gravity of the original pulverulent iron sponge, which is usually below 2, is increased by this preliminary pressing to the desired extent for the subsequent treatment in the extrusion press so as to lie between 4 and 8. By means of the following deformation process in the extrusion press in hot condition a technical iron that is to say an iron adapted for technical utilization without further metallurgical treatment possessing in respect of strength and ductility qualities similar to that of a cast ingot which has been subjected to a rolling treatment is produced, in which the other virginal properties peculiar to iron sponge with respect to freedom from detrimental elements, such as oxygen dissolved in Fe, are inherent.

Owing to the high pressure applied and a corresponding high pressing temperature, the preliminary product, which has already been considerably homogenized by mixing and pre-pressing, is converted into a homogeneous material. This conversion is due to the increased reaction velocity between the various particles of the original mixture, owing to the application of high pressure and temperature. A specific instance of this reaction between the various parts is diffusion, and it is possible to proceed from iron sponge mixed with other constituents as well as from pure sponge. To provide the surface of the iron with special properties, a layer of other material, such as metal powders or ferro alloys like ferrochrome, may be applied to the pre-pressed block and brought into close connection with the basic material thereof prior to the final pressing by diffusion glowing which is carried out in the usual manner. This sequence of operation is more advantageous and more economical than subsequent diffusion glowing on the piece that has already passed the extrusion press, since the diffusion proceeds more quickly, owing to the low density of the rough pressed block with a specific gravity of 4 to 8. According to the invention, this diffusion can be increased by correspondingly long glowing during the warming process for the subsequent pressing in the extrusion press, in which case therefore diffusion glowing is interposed during the warming of the rough pressed preliminary product prior to final pressing.

According to the invention, the final properties of the pressed technical iron are influenced within wide limits by the pressing pressure, pressing temperature, pressing speed both during rough and final pressing and by the proportion of the cross sections of the pressing chamber to the nozzle outlet. All these factors, such as temperature, speed, relation of the pressing chamber to the nozzle outlet, i. e., the degree of deformation, deformation speed and temperature, influence the work done within the material, so that the higher the degree of deformation desired at a given pressing speed the higher will be the pressure to be applied. In the same sense acts an increase in speeds at a given degree of deformation. Therefore, during the deformation process taking place at great speed and pressure, more or less work is done inside the material and is converted into heat and causes an increase in temperature which favors the chemical reactions going on between the particles of the material or their fusion or welding.

For instance, it has been found favorable, at a degree of deformation i. e. at a relation of the cross section of the pressing chamber to the nozzle outlet of 21.5 and at a temperature of about 1200° C. to use such a speed of deformation that in the interior of the material to be pressed results a pressure of about 5000 kg/cm². In order to obtain such a pressure, in this case the speed of moving the pressing bar must amount to 120 mm/sec. If in order to increase the reaction between the particles the inner pressure is to be raised to about 10000 kg/cm² during the pressing operation, the speed of the pressing bar must be raised to about 240 mm/sec.

The manner in which pressure and temperature influence the reaction between the particles of material during the pressing operation is illustrated by the following example:

The iron sponge used for the manufacture of the preliminarily pressed block possessed from its manufacture still a carbon content of about 1.7%. The degree of reduction amounted to 91% of the iron, that is to say, the remaining iron was still bound to oxygen, whereas upon forging of a small block of 60 mm² cross section to 10 mm² at a temperature of 1200 to 800° C. the carbon content was only diminished from 1.7% to 1.4%, the material subjected to extrusion pressing operation with the degree of deformation of 21.5 contained 0.24%, 0.11% and 0.045% of carbon, the carbon content of 0.24% being obtained at a pressure of 5000 kg/cm² and a temperature of 1200° C., the carbon content of 0.11% at the same pressure and a temperature raised to 1270° C. and the carbon content of 0.045% upon increasing the pressure to 7000 kg/cm² and at a temperature of 1270° C.

The degree of compression is determined by measuring the hydraulic pressure over the pressing plunger and the relation of the areas of the plunger and of the pressing bar. The pressure thus determined is transmitted within the material to all sides and causes the same to run out of the nozzles.

According to the invention, the additions to be admixed to the iron sponge prior to rough pressing may be applied for various purposes. For example, in order to attain certain properties in the finished product, the additions may have the form of metal powder or powdered ferro alloys and be admixed for the purpose of increasing workability and strength and rendering the product impervious to corrosion and stable on heating. With respect to corrosion, additions of chrome, ferrochrome and chrome alloys or phosphorus, ferrophosphorus and copper phosphide or copper may be profitably employed and applied also jointly in quantities as required for the material concerned, so as to employ for example Cr, Ni and Mo jointly as metals or in the form of their compounds.

For instance in order to obtain an iron with resistance against corrosion, by an addition of ferrophosphorus containing 20% phosphorus in the proportion of 1 to 10% to the preliminarily pressed product a finished product containing about 0.2-2% phosphorus may be produced. If an iron of special workability for the manufacture of automatic machines is to be produced an addition of technical iron sulfide may be used. For instance in order to obtain a final product containing about 0.2 to about 0.65 sulphur 0.7-2% sulphur iron may be added.

When iron sponge was used in the customary way to produce steel, i. e., in the production of steel in fused condition, some favorable properties of iron sponge were partly lost as stated. The preparatory product obtained in fused condition in the form of ingots was then subjected to further treatment in the usual way. In order to attain in the final product the desired highest qualities, it was necessary to resort to the greatest possible degree of deformation. The method of producing technical iron according to the invention eliminates these drawbacks. By a corresponding selection of the deformation pressure and temperature and the cross sectional proportions between the pressing chamber and the outlet nozzle it is possible to attain already in one operation such a degree of deformation that highest qualities are obtained.

The method according to the invention imparts to the technical iron produced other properties too which, for example, are not found in ingot steel having the same composition. During the direct reduction of iron ore to iron sponge, for instance, which served as starting product in the customary steel melting processes, it was necessary to keep the phosphorus content as low as possible in order to eliminate the detrimental properties of this alloy addition in the finished ingot steel, whereas experiments have shown that in the kinds of technical iron produced according to the invention the phosphorus content of the ore has no detrimental effect. On the contrary, ores showing certain higher contents of phosphorus have been found to be exceptionally suited for producing technical iron impervious to corrosion. It thus becomes possible to employ ores having a chemical composition which hitherto made their use either impossible or restricted it at least to a large extent.

An example for carrying out the method according to the present invention will now be described. In order to produce technical iron having, for instance, a great resistance to corrosion and to wear and tear, the powdery iron sponge is first of all thoroughly mixed with an addition of chrome or ferro-chrome, which is also in a powdery state. In order to produce iron with a chrome content of 13%, the addition comprises for instance 15% chrome or 27% of a 66% ferrochrome with 100 parts by weight of iron sponge. After these constituents have been thoroughly mixed, the mixture obtained is filled in a hollow space or chamber of cylindrical cross-section and subjected to a pressure of from 5000 to 10000 kilograms per square centimeter by means of a pressing die exactly fitting therein. By means of this high pressure, the powder mixture is compressed to such an extent that it can be ejected from the hollow space or chamber in the form of a block with a specific gravity between 5 and 6. The block thus obtained is heated in a furnace to the desired pressing temperature of about 1200° C. A diffusion glowing may previously be effected in a special furnace if it is intended to impart to the surface of the iron special properties with regard to resistance to wear and tear or to corrosion.

The block heated to 1200° C. in the first named furnace is inserted in the cylindrically recessed receiver which is shut off at one end with an outlet nozzle (matrix) whereupon the pressing die exactly fitting in the receiver is advanced to the matrix with such speed that there is produced within the material to be pressed a pressure of such a degree that practically all of the material flows out through the matrix. The pressing die may be operated in the direction of the matrix by a mechanically moved crank or by means of a hydraulic cylinder if such a speed is selected that within the material to be pressed a static pressure of from 5000 kilograms per square centimeter to 10000 kilograms per square centimeter is maintained during the pressing operation. When the pressing plunger has moved out of the matrix and the remainder of the pressed material is cut off, the technical iron, which is obtained in the form of an extruded ingot is completely forced out of the matrix.

A particularly advantageous application of the method according to the invention has to do with the production of technical iron in tubular form, as the mixture of iron sponge and certain additions rough pressed to form a hollow body is exposed during the subsequent treatment in the extrusion press and the use of a mandrel to internal and external pressure from all sides, so that the final product will disclose greatest uniformity.

The conditions of temperature and pressure and the additions used in this case are the same as above described. It is only necessary to use a hollow ingot as working material and to use in the press a tool of such a kind that before and during the application of the pressure to the material a cylindrical mandrel is inserted in its hollow part, so that by the annular space between matrix and mandrel the outlet nozzle is formed.

To make the invention better understood, the accompanying drawing illustrates by way of example a device by means of which rough pressed round or hollow ingots of iron sponge are made into the final product.

Figures 1 and 1a are longitudinal sectional and end views, respectively, of a rough pressed ingot of the round type, and Figures 1b and 1c are like views of a hollow ingot both made of iron sponge.

Figure 2 is a longitudinal section of a furnace c for heating the ingots a and b.

Fig. 3 is a diagrammatic view of a hydraulic extrusion press d provided with the pressing tools f and a hollow ingot b in the receiver e, the receiver and ingot being shown in section.

Figs. 4 and 5 are, respectively, an elevation on an enlarged scale of the pressing tool f and a section of the receiver e with the hollow ingot b inserted therein, Fig. 4 showing the device at the beginning of the pressing process and Fig. 5, during the pressing process, i. e., at a time when the hollow ingot b is for instance partly deformed already into the tubular member h.

Figs. 6 and 6a are sectional views of two products made by the extrusion press from the rough pressed round or hollow ingot, namely, a round bar g and a tubular member h, which are shown as they appear after the pressing stroke and before the portion i is cut off therefrom.

I claim:—

1. Method of producing technical iron which consists in pressing iron sponge containing carbon and iron oxide in its original pulverulent form into a rough form and subjecting the pressed material thus obtained to a further treatment in an extrusion press which causes a considerable flow of the particles of the material subjected to pressure and the friction between said particles causes them to become further heated.

2. The method of producing technical iron consisting in mixing iron sponge containing carbon and iron oxide in its original pulverulent form with additions causing the qualities intended for the final product, pressing said mixture into a preliminary form and subjecting the pressed material thus obtained to a further treatment in an extrusion press which causes a considerable flow of the particles of the material subjected to pressure and the friction between said particles causes them to become further heated.

3. The method of producing technical iron consisting in mixing iron sponge containing carbon and iron oxide in its original pulverulent form with additions causing the qualities intended for the final product, pressing said mixture into a preliminary form and subjecting the pressed material thus obtained to a further treatment in an extrusion press at a temperature between 700 and 1300° C. and a raised pressure, which causes a considerable flow of the particles of the material subjected to pressure and the friction between said particles causes them to become further heated, the exact temperature, pressure, pressing speed and the proportion of the cross sections of the pressing chamber to the nozzle outlet being regulated in accordance with the desired degree of homogeneity and solidification.

4. The method of producing technical iron consisting in mixing iron sponge containing carbon and iron oxide in its original pulverulent form with additions causing the qualities intended for the final product, pressing said mixture into a preliminary form and subjecting the pressed material thus obtained to a further treatment in an extrusion press at a temperature between 700 and 1300° C. and an increased pressure of about 5000–10,000 kg/cm$^2$, which causes a considerable flow of the particles of the material subjected to pressure and the friction between said particles causes them to become further heated, the exact temperature, pressure, pressing speed and the proportion of the cross sections of the pressing chamber to the nozzle outlet being regulated in accordance with the desired degree of homogeneity and solidification.

5. The method of producing technical iron which consists in pressing iron sponge containing carbon and iron oxide in its original pulverulent form into a tubular form and subjecting the pressed hollow body press to a further treatment in an extrusion over mandrel, which causes a considerable flow of the particles of the material subjected to pressure and the friction between said particles causes them to become further heated.

6. The method of producing technical iron consisting in mixing iron sponge containing carbon and iron oxide in its original pulverulent form with additions causing the qualities intended for the final product, pressing said mixture into a preliminary form and subjectng said rough-shaped mixture to a diffusion glowing and thereafter to a further treatment in an extrusion press which causes a considerable flow of the particles of the material subjected to pressure and the friction between said particles causes them to become further heated.

7. The method of producing technical iron which consists in pressing iron sponge containing carbon and iron oxide in its original pulverulent form into a suitable form, adding a phosphorus containing material in such quantities to the preliminarily pressed product that a finished product containing about 0.2-2% phosphorus will result therefrom and subjecting the pressed material thus obtained to a further treatment in an extrusion press which causes a considerable flow of the particles of the material subjected to pressure and the friction between said particles causes them to become further heated.

8. A wrought iron like material consisting of sponge iron containing carbon and iron oxide in its original pulverulent form in which by a preliminary pressing and a further treatment in an extrusion press the single particles rub against each other and rise in temperature which in combination cause a solidification of said single particles to a homogeneous body by chemical reaction and by welding.

9. A wrought iron like material consisting of sponge iron containing carbon and iron oxide in its original pulverulent form in admixture with alloying constituents, in which by a preliminary pressing and a further treatment in an extrusion press the single particles rub against each other and rise in temperature which in combination cause a solidification of said single particles to a homogeneous body by chemical reaction and by welding.

HEINRICH ESSER.